United States Patent [19]

Iwata

[11] 4,358,153
[45] Nov. 9, 1982

[54] SUNROOF STRUCTURE

[75] Inventor: Hidefumi Iwata, Koganei, Japan

[73] Assignee: Nissan Motor Co., Ltd., Yokohama, Japan

[21] Appl. No.: 178,058

[22] Filed: Aug. 14, 1980

[30] Foreign Application Priority Data

Aug. 18, 1979 [JP] Japan ................................ 54/104526

[51] Int. Cl.³ .............................................. B60J 7/02
[52] U.S. Cl. ..................................... 296/213; 98/2.14; 296/216
[58] Field of Search ............... 296/216, 217, 218, 154, 296/213; 98/2.14, 2.17

[56] References Cited

U.S. PATENT DOCUMENTS

| 3,955,848 | 5/1976 | Lutz | 296/218 |
| 4,005,901 | 2/1977 | Lutke | 296/218 |
| 4,126,352 | 11/1978 | Vogel | 296/218 |
| 4,165,120 | 8/1979 | Jardin | 296/217 |

FOREIGN PATENT DOCUMENTS 2399521  3/1979  France ................................ 296/218

Primary Examiner—Joseph F. Peters, Jr.
Assistant Examiner—John A. Carroll
Attorney, Agent, or Firm—Thompson, Birch, Gauthier & Samuels

[57] ABSTRACT

A vehicle sunroof structure including a movable panel arranged in a roof aperture. The front edge of the panel has two hinge components, each in the form of a hinge tongue piece. A reinforcement including a water collecting channel is attached to the vehicle roof along the aperture edge for preventing water from entering the vehicle interior. A bracket is attached the water collecting channel and includes a slot therein for receiving the hinge component of the movable panel. A hinge housing is mounted in the bracket slot for engaging the hinge component of the movable panel.

3 Claims, 5 Drawing Figures

SUNROOF STRUCTURE

BACKGROUND OF THE INVENTION

The present invention relates to a vehicle sunroof structure, and more particularly to a structure to receive hinge components attached to a movable panel arranged in a roof aperture.

An automobile with a sunroof structure is shown in FIG. 1 wherein a roof 1 is formed with a roof aperture 2, having a movable panel 3 arranged therein. The front edge 3f of the movable panel 3 is attached to the front edge of the roof aperture 2 through two detachable hinge components and the rear edge 3r of the panel is attached to a rear edge of the roof aperture through a detachable deploying mechanism.

A conventional structure for receiving a hinge component of the movable panel is shown in FIG. 2 and includes a reinforcement 6, with a water collecting channel 5, attached to the front edge of the roof aperture. The vertical wall 6w of the reinforcement 6 is formed with two slots 8 at the corresponding locations to hinge tongues 7 attached to the front edge 3f of the movable panel 3. Mounted to the vertical wall 6w at each slot 8 is a hinge housing 10 formed with a circular arcuate passage 9 for detachably receiving the hinge tongue 7.

The problem encountered with such a hinge component receiving structure is that water enters through the space between the roof aperture defining edge and the panel edge, seeps around and through the hinge connection and collects in the water collecting channel 5. From there it seeps into the space defined by the joining plate S between the reinforcement 6 and the hinge housing 10, causing the seal therebetween to deteriorate. When this happens, water seeps into the passenger compartment, thus causing permanent damage to the vehicle interior.

SUMMARY OF THE INVENTION

The vehicle sunroof structure of the present invention includes a hinge housing for receiving the extended components of a sunroof panel hinge. The hinge housing is mounted to a bracket which is mounted within a water collecting channel so that water that seeps around or through the roof panel hinge mechanism collects in the channel and is drained away, thus preventing the water from leaking into the vehicle interior.

An object of the present invention is therefore to provide a vehicle sunroof structure including a hinge component receiving structure which prevents water or rain drops from entering the vehicle interior without any sealing around the hinge housing which detachably engage the hinge components of the movable panel.

DESCRIPTION OF THE INVENTION

The present invention will be hereinafter described in connection with a preferred embodiment illustrated in FIGS. 3 to 5 of the accompanying drawings.

Figure 5:
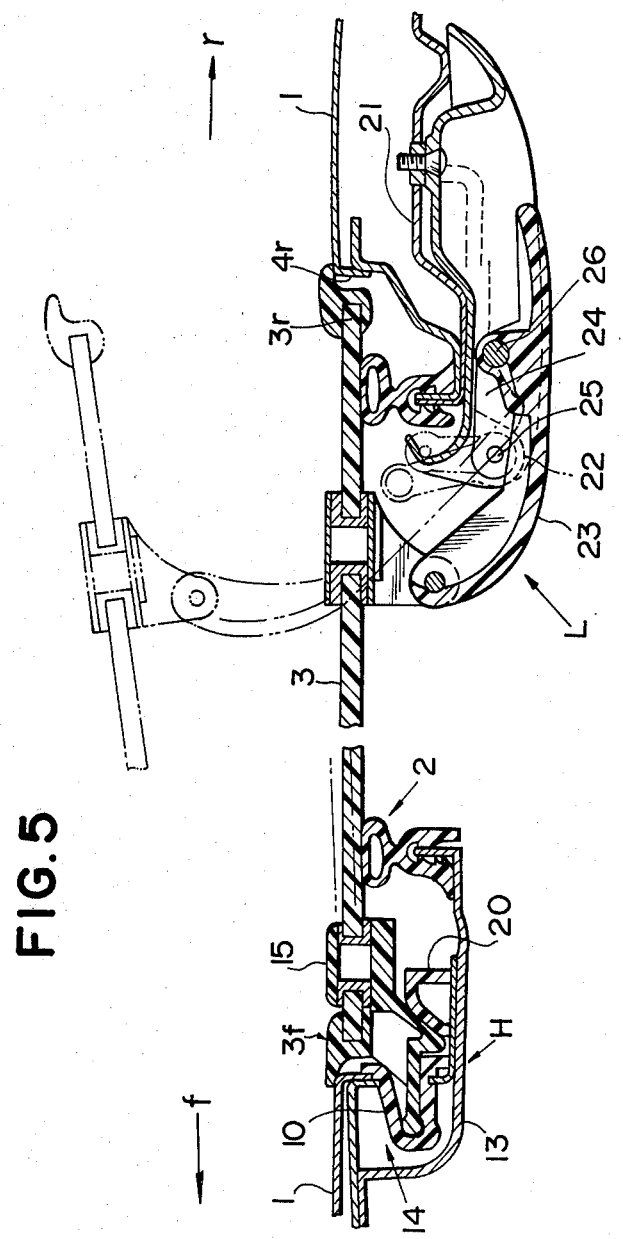
FIG. 5 is a longitudinal section through the line IV—IV in FIG. 1, showing the hinge and a deploying mechanism.

Referring to FIG. 5, there is shown a sunroof structure wherein a movable panel 3 is arranged in a roof aperture 2 in a roof 1, and a front edge 3f of the movable panel is attached to a front edge 4f of the roof aperture defining edge 4 through two detachable hinges, only one being shown at H, and a rear edge 3r of the movable panel is attached to a rear edge 4r of the roof aperture defining edge through a detachable deploying mechanism L. Each hinge device H comprises a hinge housing 10 fixedly mounted to the front edge 4f of the roof aperture, and a hinge tongue 15 attached to the panel 3 and extending from the front edge 3f thereof.

Figure 1:
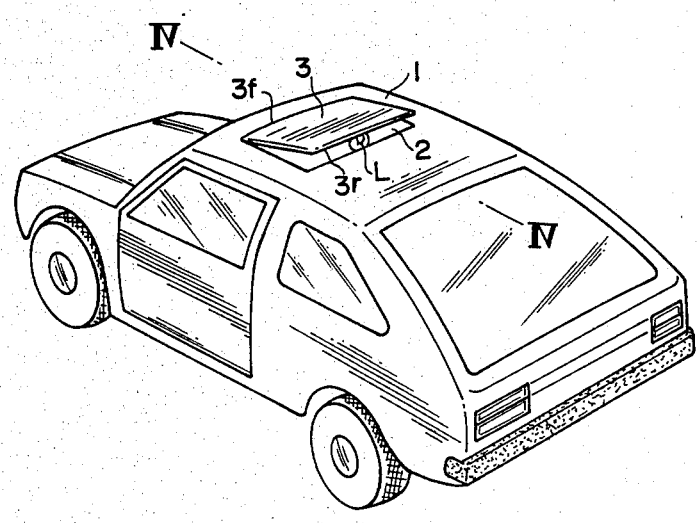
FIG. 1 is a perspective view of the automobile with a sunroof structure to which the present invention is applied.
Figure 2:
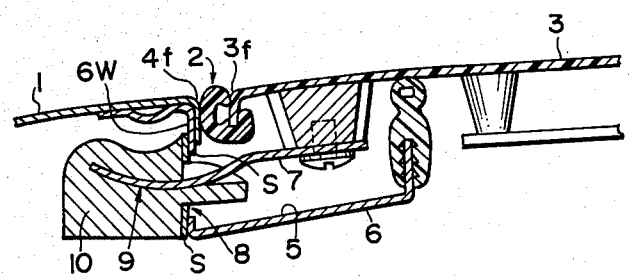
FIG. 2 is a longitudinal section of a prior art hinge component receiving structure.
Figure 3:
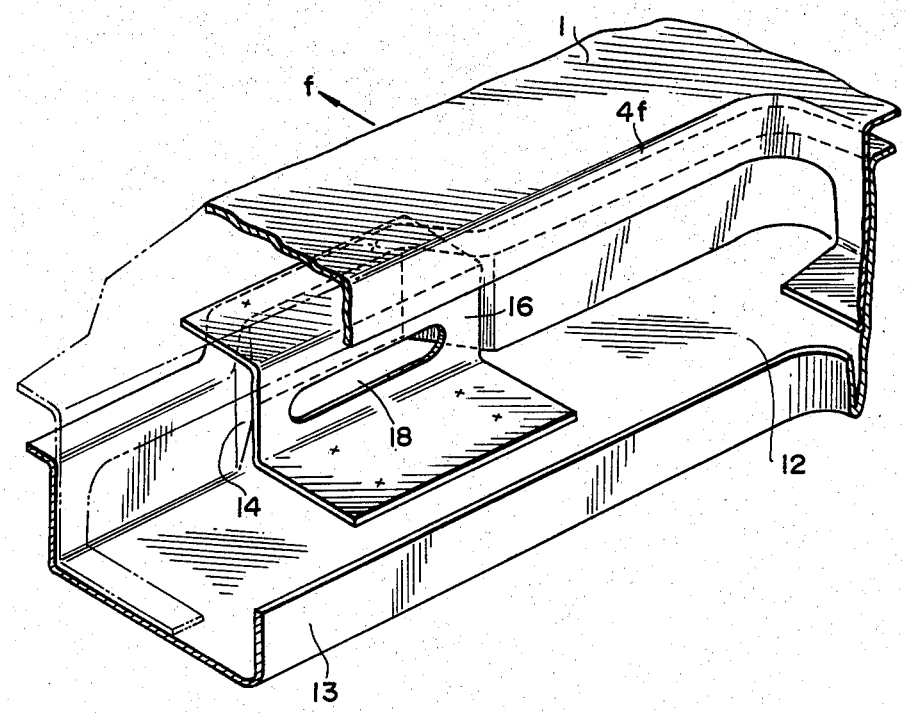
FIG. 3 is a perspective view partly broken away to show a hinge component receiving structure according to the present invention.
Figure 4:
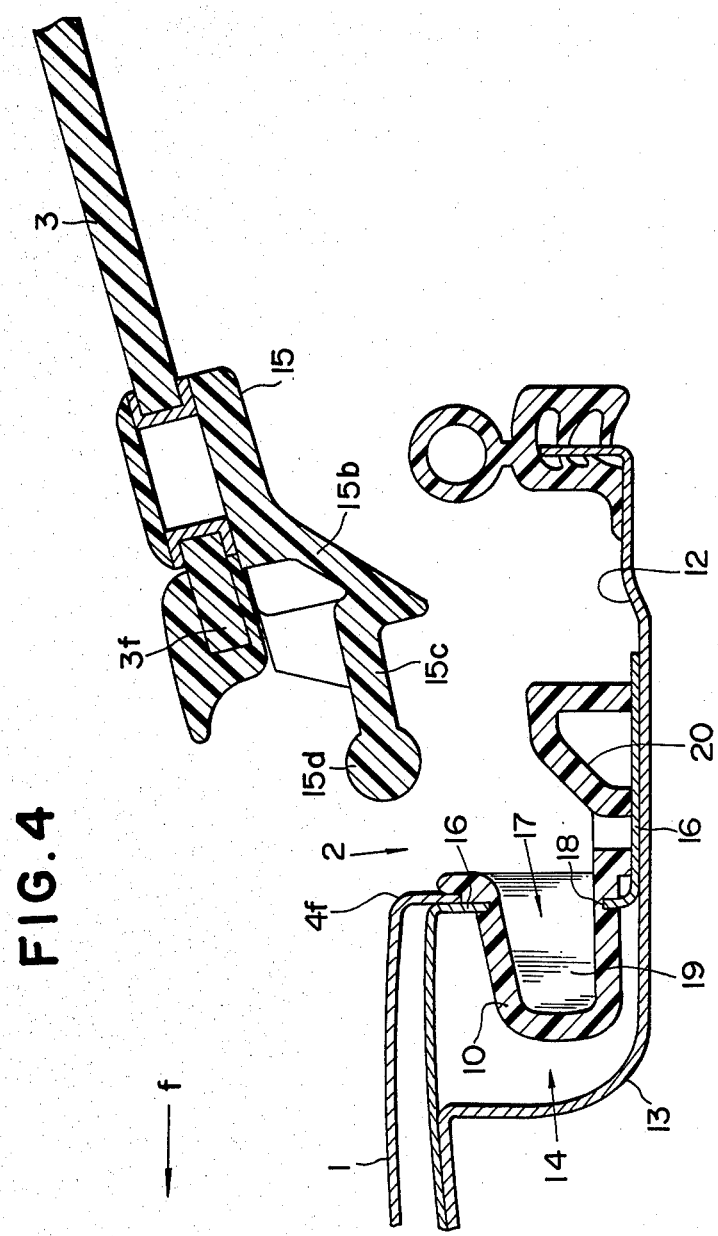
FIG. 4 is a longitudinal section of the vehicle sunroof structure of the present invention.

As shown in FIGS. 3 and 4, a reinforcement 13 defining a water collecting channel 12 is attached to the roof 1. A hinge bracket 16 is attached to the reinforcement 13 at the location of recess 14 in the reinforcement wall. The hinge bracket 16 includes a slot 18 for retaining a hinge receptacle 19. The hinge receptacle 19 includes a recess portion 17 for receiving a leading edge 15d of the hinge tongue 15, and includes an inclined cam-action section 20 for engaging a mating inclined panel hinge tongue section 15b for urging the tongue into proper seating position as the panel 3 is closed. As shown in the drawings, the water collecting channel 12 completely encloses the lower portion of the bracket 16 and the hinge receptacle 19 so that any water that may seep around the hinge is collected therein and thus prevented from leaking into the vehicle interior.

The hinge tongue 15 extending from the panel front edge 3f comprises a straight portion 15c, an inclined section 15b and the leading edge 15d. The inclined section 15b urges the panel 3 in the forward direction f when the panel is mounted.

As shown in FIG. 5, the deploying mechanism L tiltably and detachably mounts the panel rear edge 3r to the roof rear edge 4r. The front edge of a base plate 21 includes a hook 22 which opens in an advancing direction of the rear edge 3r of the panel 3 during its tiltable action; a link 24 has one end pivoted at 24 and at the other end at a pin 25 detachably received by the hook 22; a retractable lock lever (not illustrated) holds the pivot pin 25 within the hook 22 and is supported by the base plate 21; and wherein pressing the lock lever when the rear edge 3r of the panel is in the final stage of its tiltable action causes the pivot pin 25 to be disengaged from the hook 22.

Thus, when necessary to detach the panel 3 from the roof aperture 2, pulling the handle 23 from within the passenger compartment releases the pivot pin 25 from the hook 22. Moving the panel 3 in a rearward direction r to withdraw the hinge tongue 15 from the hinge housing 10 detaches the panel.

When necessary to remount the panel 3 to the roof aperture 2, the panel is held above the vehicle roof and lowered gradually with the hinge tongue 15 sliding into the receptacle 19. The lock device pivot pin 25 engages the hook 22 and the handle 23 is rotated in a closed direction to cause the panel rear edge 3r to engage the roof rear edge 4r.

As described above, since the hinge device is disposed within the water collecting channel, water leaking through the space between the edge of the roof aperture and the panel edge is collected therein and prevented from entering the vehicle passenger compartment, thus making unnecessary conventional sealing arrangements in hinge housings.

What is claimed is:

1. A vehicle sunroof structure, comprising:
   (a) a movable panel arranged in a roof aperture, said movable panel having at least one hinge component attached to a first edge thereof;
   (b) a water collecting channel attached to the vehicle roof along the aperture edge for preventing water from entering the vehicle interior, said channel having a wall portion which depends from said roof panel and which includes a recess;
   (c) a bracket attached to said water collecting channel so as to enclose said recess and define a chamber, said bracket including a slot therein opposite to said wall portion; and
   (d) a hinge housing protruding through said slot in said bracket into said chamber, said hinge housing receiving and engaging said hinge component of said movable panel.

2. In a vehicle sunroof structure having a roof panel formed with an aperture and a movable panel for closing said aperture, the combination comprising:
   a water collecting channel member disposed about the periphery of said aperture, said channel member having a wall section depending from said roof panel in which is formed a recess;
   a bracket fixed to said channel member so as to enclose said recess and define a chamber;
   means defining a slot in said bracket opposite to said depending wall section;
   a cup-like hinge receptacle protruding through said slot into said chamber, said hinge receptacle receiving therein a hinge component attached to said movable panel.

3. The combination as claimed in claim 2, wherein said cup-like hinge receptacle further includes an inclined cam-action section, and said hinge component includes an inclined panel hinge tongue section which mates with said cam-action section for urging a tongue portion of said hinge component into said cup-like hinge receptacle.

* * * * *